No. 630,840. Patented Aug. 15, 1899.
H. ARON.
APPARATUS FOR MEASURING ELECTRIC CURRENTS.
(Application filed Dec. 30, 1897.)
(No Model.)
Fig. 1.
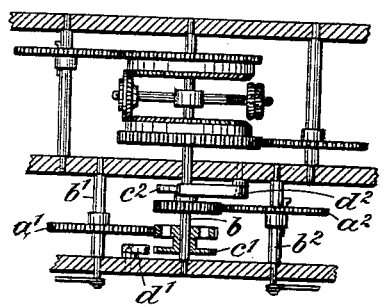
Fig. 5.
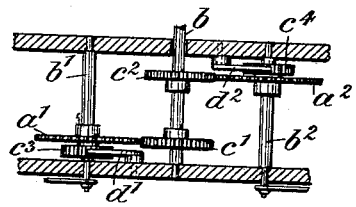
Fig. 2.
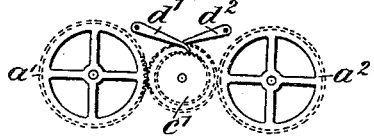
Fig. 6.
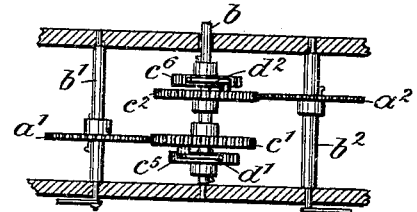
Fig. 3.
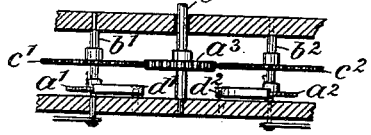
Fig. 7.
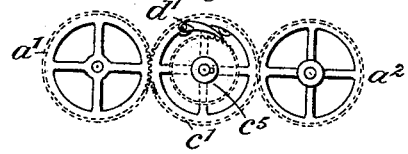
Fig. 4.
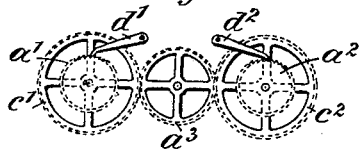
Fig. 8.
Witnesses:
C. Seipel
E. Wolf
Hermann Aron
Inventor
by Othmar Lenz, his attorney

UNITED STATES PATENT OFFICE.

HERMANN ARON, OF BERLIN, GERMANY.

APPARATUS FOR MEASURING ELECTRIC CURRENTS.

SPECIFICATION forming part of Letters Patent No. 630,840, dated August 15, 1899.

Application filed December 30, 1897. Serial No. 664,788. (No model.)

*To all whom it may concern:*

Be it known that I, HERMANN ARON, a subject of the King of Prussia, German Emperor, residing at Berlin, in the Kingdom of Prussia, German Empire, have invented certain new and useful Improvements in Apparatus for Measuring Electric Currents of Different Directions, (for which I have obtained a patent in Germany, No 68,633, dated July 24, 1892,) of which the following is a specification.

My invention relates to improvements in apparatus for measuring electric currents flowing in different directions, especially destined to measure and record the current in charging and discharging storage batteries.

In electrical plants supplied by a storage battery or batteries it is preferred to measure and record separately the current in charging and in discharging the battery or batteries. This may be accomplished by employing separate apparatus; but the performance will be greatly simplified and also improved if one single measuring and recording apparatus be employed for registering both the charge and the discharge current. To provide apparatus of this kind, I have invented the following constructions, illustrated by the accompanying drawings, in which—

Figure 1 is a plan of the essential mechanism of the measuring instrument, and Fig. 2 a front elevation of the train of wheels constituting the recording device. Figs. 3 and 4 are similar views of a modified construction. Figs. 5 and 6 represent in similar views another modification, and Figs. 7 and 8 are corresponding views of a further modification.

To obtain the object in view, the apparatus is provided with two counting-gears $a'$ and $a^2$, each of which is arranged to turn in one direction only, while being prevented from turning in the opposite direction. The stopping device, however, must in its action be limited to the counting-gear proper. Those parts of the apparatus through the motion of which the measuring operation is performed must be free from any influence of said stopping device and enabled to turn in a forward direction, according to the amount of current passing in charging as in discharging the battery. The said measuring part of the apparatus accordingly is coupled to the said counting-gears $a'$ and $a^2$ by frictional contact of such amount that friction is sufficient to carry along the counting-work, which is not stopped, while at the same time said friction is not of such avail as to impair the measuring motion by the resistance opposed to the said counting-work. The said frictional coupling is accomplished by mounting on a shaft $b$ of the apparatus, which shaft may freely turn in either direction, two wheels $c'\ c^2$, said wheels having so much friction against the shaft to carry along a counting-gear not stopped, and thereby to perform registration. The other counting-gear being stopped is not carried along by its corresponding wheel, and the latter is forced to turn on the shaft $b$.

The stopping-pawls $d'\ d^2$ may catch directly into the wheels $c'\ c^2$, frictionally mounted on the shaft $b$, as illustrated by Figs. 1 and 2, or they may engage separate ratchet-wheels $c^3\ c^4$ on the axis of the counting-gears $a'\ a^2$, as shown in Figs. 5 and 6.

In the modification represented by Figs. 3 and 4 a wheel $a^3$ is keyed to the shaft $b$, said wheel engaging two wheels $c'\ c^2$, frictionally mounted on their respective shafts $b'$ and $b^2$. The counting-work stopped by its pawl and ratchet-wheel will not be advanced, its wheel being forced to turn on its stopped shaft, while the other counting-work not stopped is being turned by the said wheel $a^3$.

In the further modification illustrated by Figs. 7 and 8 the two wheels $c'$ and $c^2$ instead of being frictionally mounted on the shaft $b$ are coupled to the said shaft by means of a Pouyer's clutch or a similar device. The wheels $c'$ and $c^2$ are provided each with a pawl $d'$ and $d^2$ and loosely placed on their shaft $b$, to which ratchet-wheels $c^5\ c^6$ are keyed to be engaged by the said pawls $d'\ d^2$. By means of the said pawls the said ratchet-wheels $c^5\ c^6$ impart motion to the loose wheels $c'\ c^2$ in one direction only, while either of the said loose wheels is prevented from turning in the opposite direction.

I claim as my invention—

Apparatus for separately measuring electric currents which are alternately flowing in opposite directions, comprising two recording devices, each turning but in one direction and locked against turning in the other direction, the said recording devices being separately actuated by a common shaft, substantially as and for the purpose set forth.

HERMANN ARON.

Witnesses:
 OTHMAR LENZ,
 CHAS. H. DAY,
 E. WOLF.